United States Patent
Capota et al.

(10) Patent No.: US 9,818,042 B2
(45) Date of Patent: Nov. 14, 2017

(54) METHOD OF INCIDENT SCENE FOCUS AREA DETERMINATION

(71) Applicant: MOTOROLA SOLUTIONS, INC., Schaumburg, IL (US)

(72) Inventors: Mircea Capota, Boca Raton, FL (US); Scott M. Alazraki, Davie, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 57 days.

(21) Appl. No.: 14/964,277

(22) Filed: Dec. 9, 2015

(65) Prior Publication Data

US 2017/0169308 A1 Jun. 15, 2017

(51) Int. Cl.
*G06K 9/00* (2006.01)
*G06K 9/50* (2006.01)
*G06K 9/62* (2006.01)

(52) U.S. Cl.
CPC .......... *G06K 9/50* (2013.01); *G06K 9/00255* (2013.01); *G06K 9/623* (2013.01)

(58) Field of Classification Search
CPC .......... H04N 13/0285; H04N 5/23212; G06K 9/00805; G06T 2207/10004
See application file for complete search history.

(56) References Cited

U.S. PATENT DOCUMENTS

| | | | | |
|---|---|---|---|---|
| 5,739,518 A | * | 4/1998 | Wang | G06K 7/10871 235/462.09 |
| 8,036,678 B2 | | 10/2011 | Goldenberg et al. | |
| 8,478,515 B1 | * | 7/2013 | Foucher | G01C 21/20 701/1 |
| 2014/0334463 A1 | * | 11/2014 | Lipman | G01S 5/14 370/338 |

FOREIGN PATENT DOCUMENTS

| | | |
|---|---|---|
| EP | 2706487 | 12/2014 |
| WO | 2014124270 | 8/2014 |
| WO | 2014124273 | 8/2014 |

* cited by examiner

*Primary Examiner* — Eueng-Nan Yeh
(74) *Attorney, Agent, or Firm* — Michael Best & Friedrich LLP (57) ABSTRACT

Data analytics engines and methods of incident scene focus area determination. The method includes receiving a plurality of directional inputs from a plurality of sources. The method also includes assigning weighting factors to the plurality of directional inputs. The method further includes generating weighted position vectors for each of the plurality of sources based on the plurality of directional inputs and the weighting factors. The method also includes determining when the weighted position vectors for at least two sources of the plurality of sources intersect. The method further includes determining an intersection location and a confidence level based on the weighted position vectors of the at least two sources. The method also includes identifying an incident scene focus area based on the intersection location and the confidence level.

20 Claims, 7 Drawing Sheets

METHOD OF INCIDENT SCENE FOCUS AREA DETERMINATION

BACKGROUND OF THE INVENTION

Public safety agencies, for example, fire departments, police departments, and other entities respond to and manage emergencies, fires, vehicle accidents, crime scenes, protests, and other incidents. Knowing the location where an incident is occurring improves decision making. It also improves the identification and deployment of resources, including informing resources located proximate to the incident that the incident is occurring.

When police or other law enforcement personnel arrive on the scene of a crime or criminal investigation, the central location of criminal activity and the location of criminal suspects or other persons of interest are not always apparent. The difficulty of determining which resources to use at an incident may increase when such location information is unavailable. Similar difficulties may arise for other first responders or safety personnel facing similar information deficits when they arrive on the scene of other incidents.

Accordingly, there is a need for incident scene focus area determination.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments include a method of incident scene focus area determination. The method includes receiving a plurality of directional inputs from a plurality of sources. The method also includes assigning weighting factors to the plurality of directional inputs. The method further includes generating weighted position vectors for each of the plurality of sources based on the plurality of directional inputs and the weighting factors. The method also includes determining when the weighted position vectors for at least two sources of the plurality of sources intersect. The method further includes determining an intersection location and a confidence level based on the weighted position vectors of the at least two sources. The method also includes identifying an incident scene focus area based on the intersection location and the confidence level.

Other exemplary embodiments include a data analytics engine for incident scene focus area determination. In some embodiments, the data analytics engine includes a transceiver and an electronic processor. The transceiver is configured to communicate with a plurality of sources through at least one communication network. The electronic processor is electrically coupled to the transceiver. The electronic processor is configured to receive a plurality of directional inputs from the plurality of sources. The electronic processor is also configured to assign weighting factors to the plurality of directional inputs. The electronic processor is further configured to generate weighted position vectors for each of the plurality of sources based on the plurality of directional inputs and the weighting factors. The electronic processor is also configured to determine when the weighted position vectors for at least two sources of the plurality of sources intersect. The electronic processor is further configured to determine an intersection location and a confidence level based on the weighted position vectors of the at least two sources. The electronic processor is also configured to identify the incident scene focus area based on the intersection location and the confidence level.

Figure 1A:
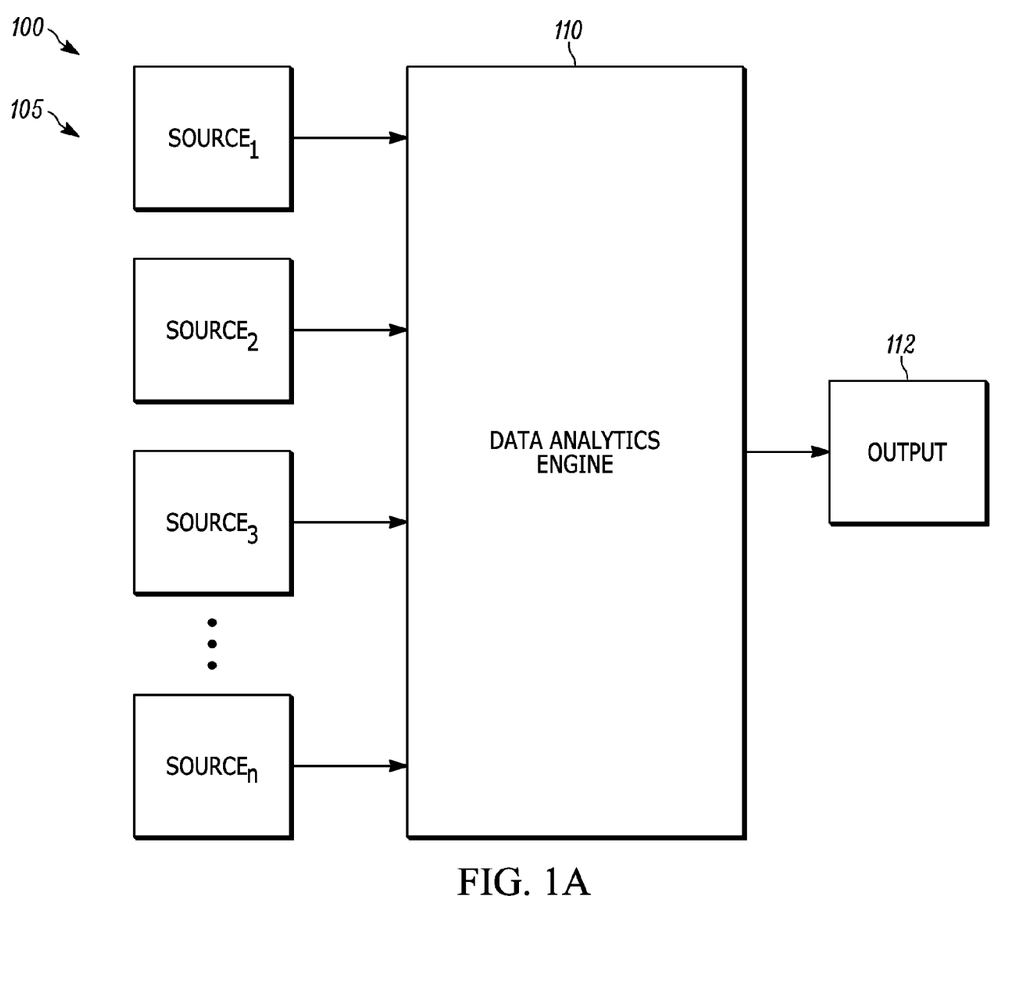
FIG. 1A is a functional block diagram of a data analytics system, in accordance with some embodiments.

FIG. 1A is a functional block diagram of one example of a data analytics system 100 for incident scene focus area determination. The data analytics system 100 includes, among other things, a plurality of sources 105 (for example, n sources) and a data analytics engine 110. The plurality of sources 105 send data to the data analytics engine 110, as will be described in greater detail below. The data analytics engine 110 determines an indecent scene focus area by performing an analysis using the data received from the plurality of sources 105, as will be described in greater detail below. The data analytics engine 110 generates an output 112 (for example, a map) which indicates the locations of incident scene focus areas.

Figure 1B:
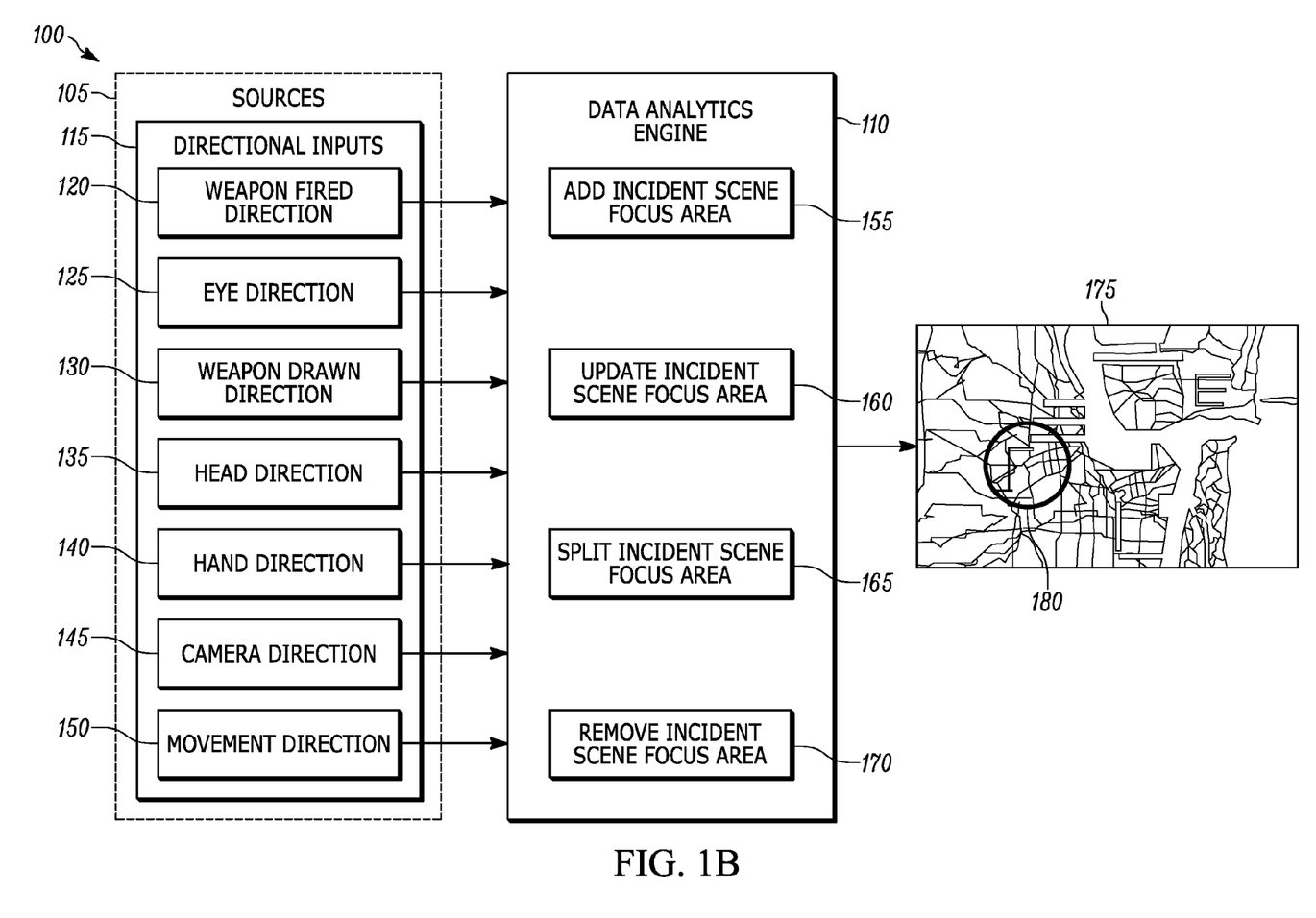
FIG. 1B is a functional block diagram of a data analytics system, in accordance with some embodiments.

FIG. 1B is a functional block diagram of one example of the data analytics system 100. The plurality of sources 105 includes, among other things, sensors, cameras, and other devices, including devices carried or worn by individuals such as public safety personnel (for example, police officers, paramedics, and fire fighters), devices located on or in buildings, and devices located on or in vehicles. The plurality of sources 105 may include, for example, head-mounted displays, intelligent weapons or holsters (for example, a holster that can transmit information indicating when a weapon is drawn or holstered), body-worn cameras, and body-worn global positioning systems (GPS) or similar location-providing devices (for example, a smart mobile phone worn on a belt). Each of the plurality of sources 105 determines and transmits directional information. For example, a camera, including a body-worn or vehicle mounted camera, may provide information regarding a camera field of view or information regarding a direction of movement of an object captured in an image. Directional information (for example, positional coordinates that change over time) may be provided by a global positioning system device. The directional information is received by the data analytics engine 110 as a plurality of directional inputs 115. The plurality of directional inputs 115 includes, among other things, a weapon fired direction 120 (which may be provided from, for example, a camera or smart weapon), an eye direction 125 (which may be provided from, for example, an eye-tracking, head-mounted display), a weapon drawn direction 130, a head direction 135, a hand direction 140 (which may be provided from, for example, a camera, an arm/gesture sensor, or a smart watch), a camera direction 145, and a movement direction 150. The plurality of directional inputs 115 represent the directions in which the sources 105 are pointing or headed. For example, the head direction 135 indicates the direction of an individual's head as detected by, for example, a head-mounted display. More details regarding certain exemplary sources 105 are provided below in connection with the explanation of FIG. 3.

The data analytics engine 110 identifies incident scene focus areas based in part on intersections of the plurality of directional inputs 115 received from the plurality of sources 105. In particular, the data analytics engine 110 determines when it has received intersecting directional inputs 115 from two or more of the plurality of sources 105. For example, the data analytics engine 110 determines when the sensed eye direction 125 of multiple individuals is the same or correlated. The existence of such a correlation may be used by the data analytics engine 110 to determine that multiple individuals are looking at a single location or an object or person of interest at the single location.

The data analytics engine 110 performs one or more actions based on the plurality of directional inputs 115. The plurality of actions includes, among other things, adding a new incident scene focus area 155, updating an existing incidence scene focus area 160, splitting an incident scene focus area 165, and removing an existing incident scene focus area 170. The data analytics engine 110 outputs a map 175 which indicates the locations of the incident scene focus areas. For example, the map 175 illustrated in FIG. 1B includes an indicator 180 of the location of an incident scene focus area.

Figure 2:
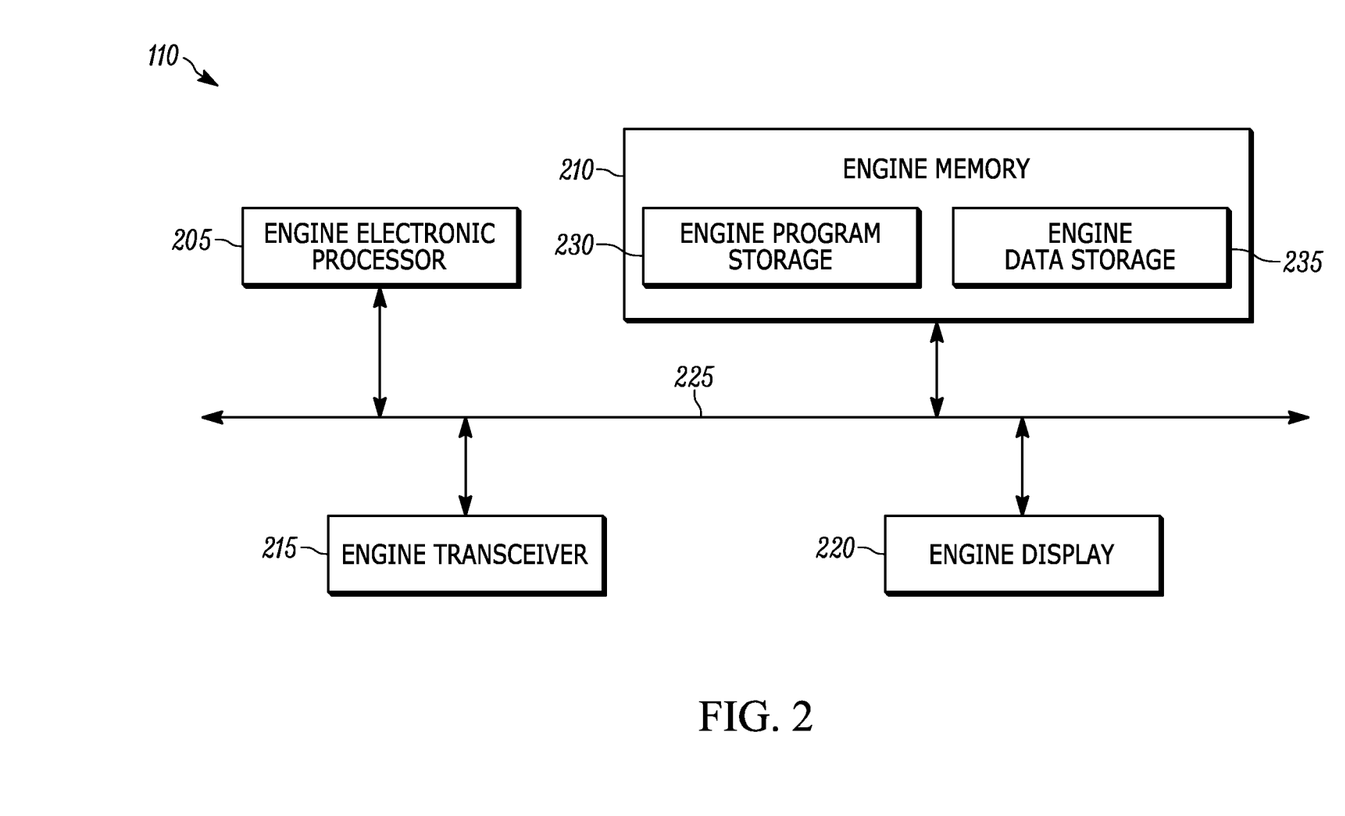
FIG. 2 is a block diagram of a data analytics engine, in accordance with some embodiments.

FIG. 2 is block diagram of a data analytics engine 110, in accordance with some embodiments. In the embodiment illustrated in FIG. 2, the data analytics engine 110 includes, among other things, an engine electronic processor 205 (for example, a microprocessor, a microcontroller, or another suitable programmable device), an engine memory 210, an engine transceiver 215, and an engine display 220. In other embodiments, the data analytics engine 110 can include less or more elements and/or less or more of each of the elements describes herein. The engine electronic processor 205, the engine memory 210, the engine transceiver 215, and the engine display 220 are communicably coupled with one another via, for example, an engine system bus 225.

The engine memory 210 includes, among other things, an engine program storage 230 and an engine data storage 235. The engine program storage 230 and the engine data storage 235 can include combinations of different types of memory, such as read only memory (ROM), random access memory (RAM) (for example, dynamic RAM [DRAM], synchronous DRAM [SDRAM], etc.), electrically erasable programmable read only memory (EEPROM), flash memory, a hard disk, a Secure Digital (SD) memory card, or other suitable magnetic, optical, physical, or electronic memory devices or data structures. The engine electronic processor 205 is connected to the engine memory 210 and executes software instructions that are capable of being stored in a RAM of the engine memory 210 (for example, during execution), a ROM of the engine memory 210 (for example, on a generally permanent basis), or another non-transitory computer readable medium such as another memory or a disc. Software included in some embodiments of the data analytics engine 110 can be stored in the engine memory 210. The software includes, for example, firmware, one or more applications, program data, filters, rules, one or more program modules, and other executable instructions. The engine electronic processor 205 is configured to retrieve from the engine memory 210 and execute, among other things, instructions related to the control processes and methods described herein.

The engine transceiver 215 sends and/or receives signals to and/or from one or more separate transceivers (for example, transceivers of sources 105). Signals include, among other things, information, data, and data packets. The engine transceiver 215 can be coupled to one or more separate transceivers via, for example, wired connections, fiber optic connections, and/or wireless connections. Wireless communication can be implemented using various wireless network topologies known to those skilled in the art, including for example, two-way digital radio topologies, cellular topologies, and others. Communication via wired and/or fiber optic connections can be implemented using various appropriate network topologies including networks using, for example, Ethernet or similar protocols.

The engine display 220 includes, among other things, any type of visual display (for example, cathode ray tube [CRT], liquid crystal display [LCD], light-emitting diode [LED], plasma, and organic light-emitting diode [OLED]) appropriate for displaying, among other things, the map 175 of the incident scene focus area. In some embodiments, the engine display 220 is separated from the data analytics engine 110.

Figure 3:
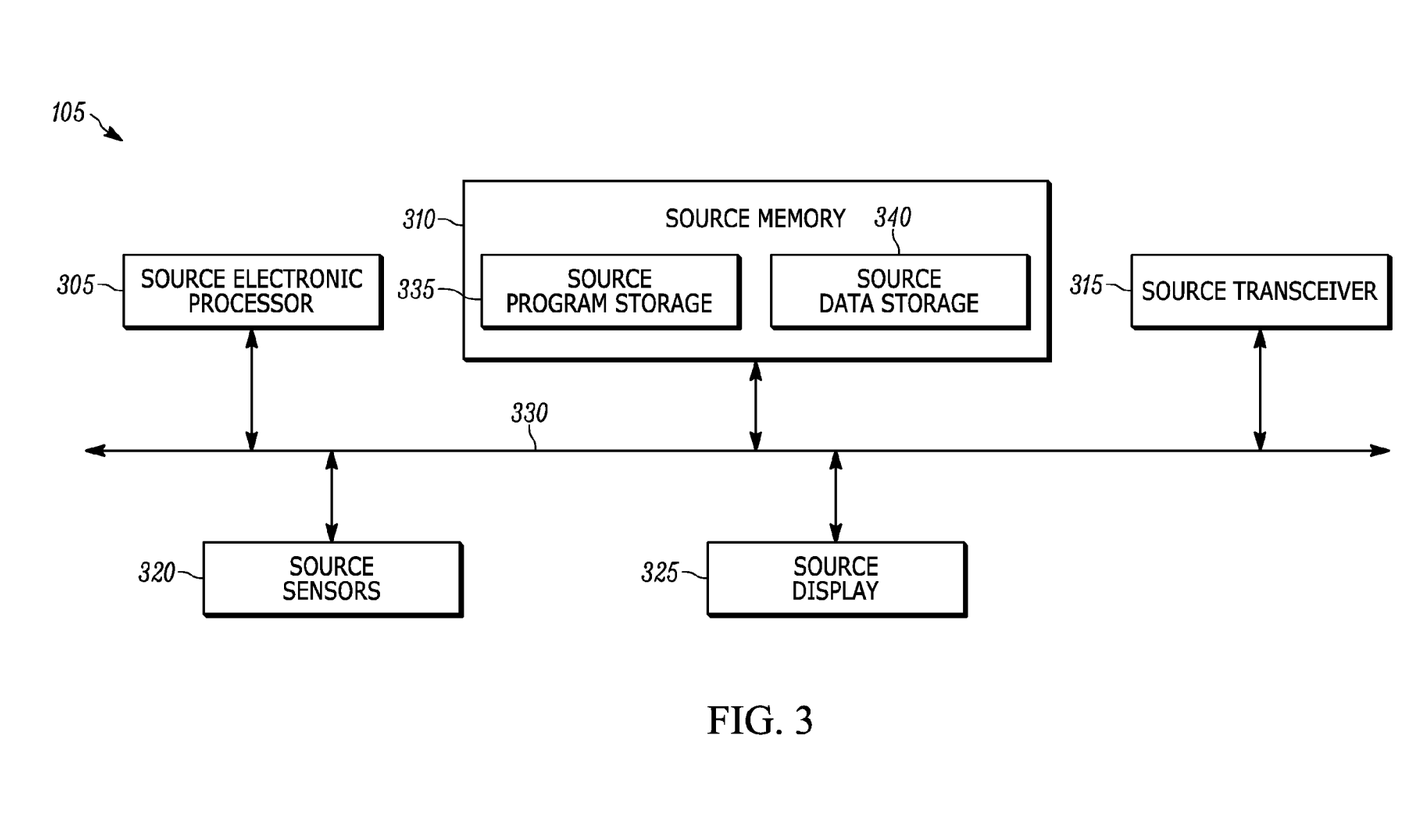
FIG. 3 is a block diagram of a source, in accordance with some embodiments.

FIG. 3 is block diagram of a source 105, in accordance with some embodiments. In the embodiment illustrated in FIG. 3, the source 105 includes, among other things, a source electronic processor 305 (for example, a microprocessor, a microcontroller, or another suitable programmable device), a source memory 310, a source transceiver 315, and a plurality of source sensors 320. In other embodiments, the source 105 can include less or more elements and/or less or more of each of the elements described herein. In some embodiments, a source 105 may also include a source display 325. The source electronic processor 305, the source memory 310, the source transceiver 315, the plurality of source sensors 320, and the source display 325 are communicably coupled with one another via, for example, a source system bus 330.

The source memory 310 includes, among other things, a source program storage 335 and a source data storage 340. The source program storage 335 and the source data storage 340 can include combinations of different types of memory, including the various types of memory describe above in with respect to the engine memory 210. The source electronic processor 305 is connected to the source memory 310 and executes software instructions that are capable of being stored in a RAM of the source memory 310 (for example, during execution), a ROM of the source memory 310 (for example, on a generally permanent basis), or another non-transitory computer readable medium such as another memory or a disc. Software included in some embodiments of the source 105 can be stored in the source memory 310. As with other software described above, the software may include, for example, firmware, one or more applications, program data, filters, rules, one or more program modules, and other executable instructions. The source electronic processor 305 is configured to retrieve from the source memory 310 and execute, among other things, instructions related to the control processes and methods described herein.

The source transceiver 315 sends and/or receives signals to and/or from one or more separate transceivers (for example, the engine transceiver 215). Signals may include, among other things, directional inputs 115, information, data, and data packets. The source transceiver 315 can be coupled to one or more separate transceivers via, for example, wired connections, fiber optic connections, and/or wireless connections. Wireless communication can be implemented using various wireless network topologies known to those skilled in the art, including for example, two-way digital radio topologies, cellular topologies, and others. Communication via wired and/or fiber optic connections can be implemented using various appropriate network topologies including networks using, for example, Ethernet or similar protocols.

The source sensors 320 determine, among other things, the directional information of any particular source 105. In some embodiments, the source sensors 320 include, among other things, optical sensors (for example, cameras), motion sensors (for example, accelerometers and gyroscopes), and location sensors (for example, GPS). As an example, a motion sensor coupled to a police officer's weapon can determine the weapon drawn direction 130. As a further example, a camera coupled to a head-mounted display can determine the eye direction 125 of a police officer.

The source display 325 may include a visual display (for example, a display of one of the types mentioned above with respect to the engine display 220) appropriate for displaying, among other things, the map 175 of the incident scene focus area and notifications. In some embodiments, the source display 325 includes a head-mounted display.

Figure 4A:
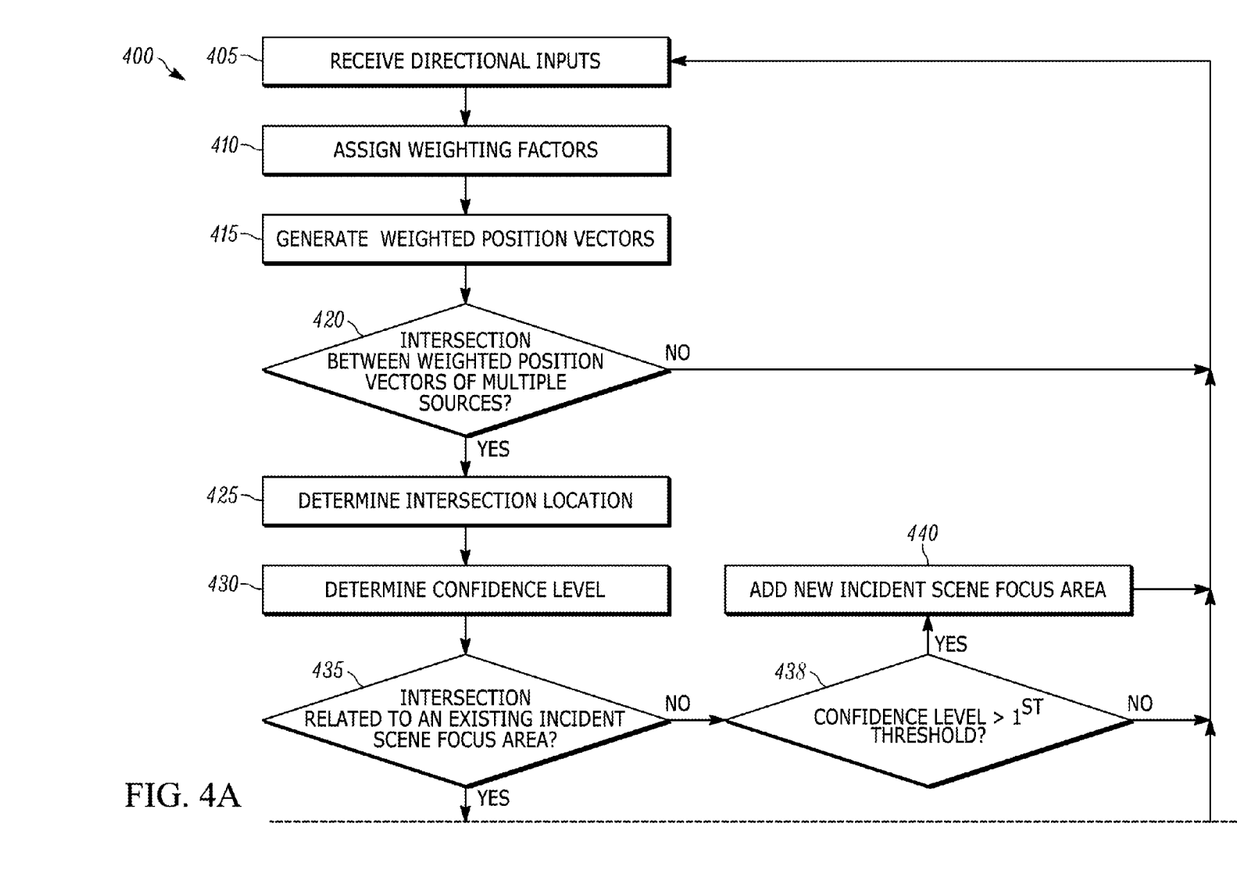
FIGS. 4A and 4B are a flowchart of incident scene focus area determination, in accordance with some embodiments.
Figure 4B:
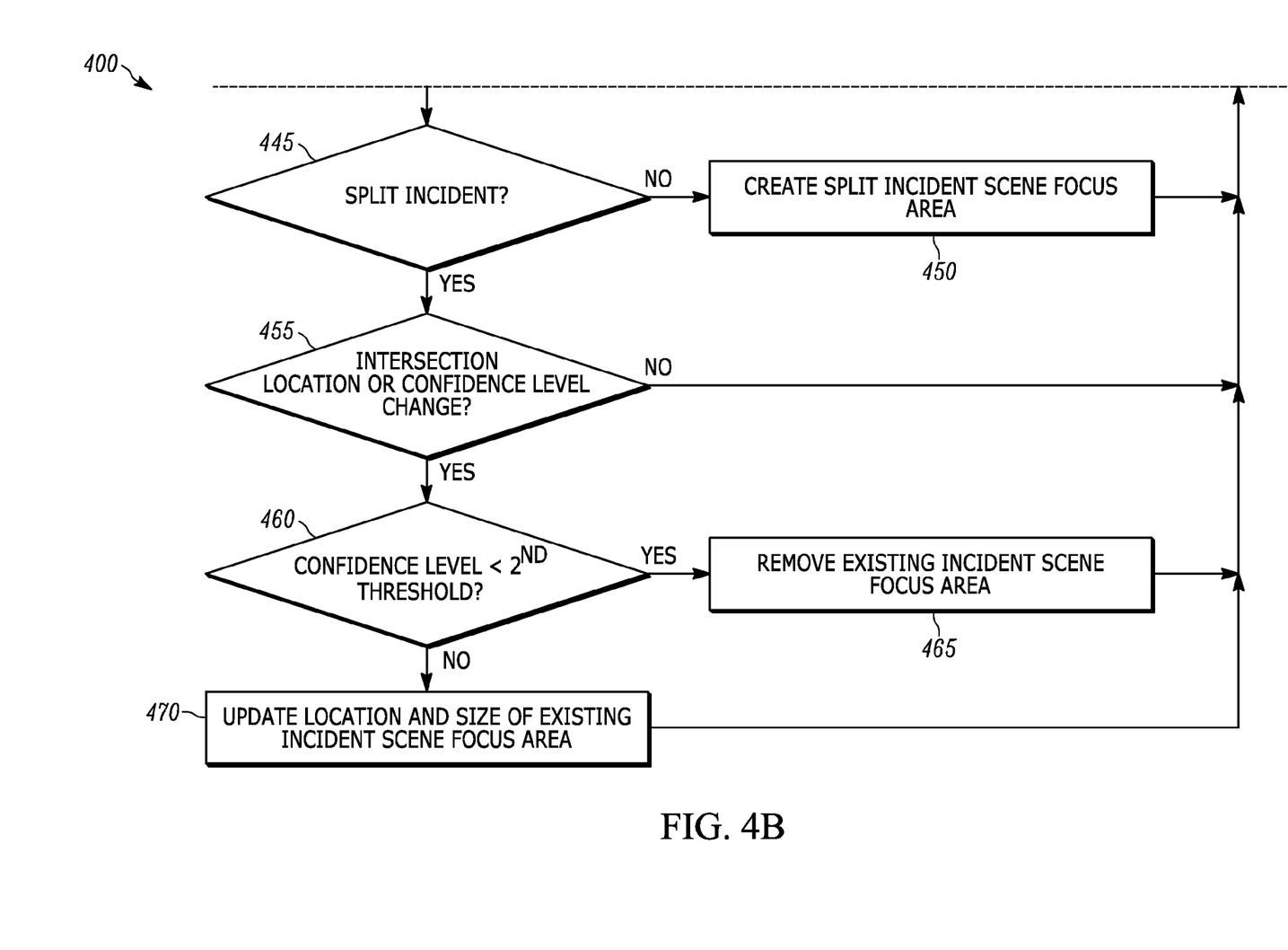

FIGS. 4A and 4B illustrate an example of a method 400 (or process) of incident scene focus area determination implemented, for example, by the data analytics system 100. Referring to FIG. 4A, in block 405, the data analytics engine 110, receives a plurality of directional inputs 115 from a plurality of sources 105.

In block 410, the data analytics engine 110 assigns a weighting factor to each of the directional inputs 115. Some of the directional inputs 115 are better indicators of the location of an incident scene focus area than others. For example, a weapon fired direction 120 generally provides a better indication of the location of an incident scene focus area than a hand direction 140. In some embodiments, a weighting factor (for example, a first weighting factor) that is assigned to the weapon fired direction 120 is greater than a weighting factor (for example, a second weighting factor) that is assigned to the hand direction 140. An exemplary set of weighting factors is included in Table #1 below.

TABLE #1

Exemplary Set of Weighting Factors

| Directional Input | Weighting Factor |
|---|---|
| Weapon Fired Direction | 1.0 |
| Eye Direction | 0.8 |
| Weapon Drawn Direction | 0.7 |
| Head Direction | 0.6 |
| Hand Direction | 0.4 |
| Camera Direction | 0.4 |
| Movement Direction | 0.4 |

In block 415, the data analytics engine 110 generates weighted position vectors for each of the plurality of sources 105. In some embodiments, the data analytics engine 110 generates the weighted position vectors based in part on the plurality of directional inputs 115 and the set of weighting factors. Each of the weighted position vectors include, among other things, headings and field of views of sources 105.

In block 420, the data analytics engine 110 determines when the weighted position vectors of multiple nearby sources 105 intersect. For example, the data analytics engine 110 determines, based on the weighted position vectors from sources 105, when multiple safety personnel are looking at the same person or object. The method 400 proceeds to block 425 when the weighted position vectors of at least two sources of the plurality of sources 105 intersect. Alternatively, the method 400 returns to block 405.

In block 425, the data analytics engine 110 determines an intersection location between the weighted position vectors of multiple nearby sources 105. In some embodiments, the data analytics engine 110 determines the intersection location by combining the weighted position vectors from multiple nearby sources 105 using a sum of products type of calculation.

In block 430, the data analytics engine 110 determines a confidence level indicative of the level of confidence in the determination that the intersection of weighted position vectors from multiple nearby sources 105 indicates the formation of an incident. The confidence level may be on a scale of zero to one-hundred percent. The data analytics engine 110 determines the confidence level based in part on a plurality of factors including, among other things, a quantity of sources 105 with intersecting weighted position vectors and distances between sources 105 with intersecting weighted position vectors.

In block 435, the data analytics engine 110 determines when the intersection is related to an existing incident scene focus area. In some embodiments, the data analytics engine 110 makes this determination based on the sources 105 with intersecting weighted position vectors. For example, the data analytics engine 110 determines that the intersection is related to an existing incident scene focus area when any of the sources 105 involved in the intersection are also involved in an existing incident scene focus area. The method 400 proceeds to block 438 when the intersection is not related to an existing incident scene focus area. Alternatively, the method 400 proceeds to block 445 when the intersection is related to an existing incident scene focus area.

In block 438, the data analytics engine 110 determines when the confidence level is greater than a first threshold. The method 400 proceeds to block 440 when the confidence level is greater than the first threshold. Alternatively, the method 400 returns to block 405 when the confidence level is less than or equal to the first threshold.

In block 440, the data analytics engine 110 adds a new incident scene focus area. The data analytics engine 110 identifies the new incident scene focus area based in part on the intersection location and the confidence level. In some embodiments, a size of the incident scene focus area is proportional to the confidence level. For example, in some embodiments, the new incident scene focus area includes a circular region that is centered at the intersection location and has a radius that is proportional to the confidence level. In some embodiments, the method 400 returns to block 405 after block 440.

Referring to FIG. 4B, in block 445, the data analytics engine 110 determines when an existing incident scene focus area splits into two or more separate incident focus scene areas. In some situations, an incident scene focus area splits up into two or more separate incident scene focus areas. For example, at a criminal incident, one suspect may run in one direction while another suspect runs in a different direction. In some embodiments, the data analytics engine 110 differentiates between a growing incident and a split incident. The data analytics engine 110 detects a split incident when the weighted position vectors of one or more sources 105 involved in an existing incident scene focus area are different from the weighted position vectors of other sources 105 involved in the existing incident scene focus area. For example, some police officers are running with an eye direction 125 that is different from other police officers that still have a prior eye direction. The method 400 proceeds to block 450 when a split incident is detected. Alternatively, the method 400 proceeds to block 455.

In block 450, the data analytics engine 110 creates a split incident. A split incident includes at least two separate incident scene focus areas. In some embodiments, the method 400 returns to block 405 after block 450.

In block 455, the data analytics engine 110 determines when the intersection location or confidence level changes from the previous values. The method 400 proceeds to block 460 when either the intersection location or the confidence level changes. Alternatively, the method 400 returns to block 405 when there is no change in either the intersection location or the confidence level.

In block 460, the data analytics engine 110 determines when the confidence level is less than a second threshold. The method 400 proceeds to block 465 when the confidence level is less than the second threshold. Alternatively, the method 400 proceeds to block 470 when the confidence level is greater than or equal to the second threshold. In some embodiments, the second threshold is less than the first threshold.

In block 465, the data analytics engine 110 removes the existing incident scene focus area. In some embodiments, the method 400 returns to block 405 after block 465.

In block 470, the data analytics engine 110 updates the location and/or size of the existing incident focus area based on the change(s) in the intersection location and/or the confidence level. In some embodiments, the method 400 returns to block 405 after block 470.

In some embodiments, the data analytics engine 110 provides feedback to sources 105 with directional inputs 115 that are being used to identify an incident scene focus area. Feedback includes, among other things, visual notifications and/or auditory notifications. For example, a small red dot may appear in the corner of a public safety personnel's head-mounted display when their directional inputs 115 are being used to create a new incident scene focus area. As a further example, an alert tone may be emitted by a public safety personnel's radio. In some embodiments, the feedback changes (for example, escalates) to inform public safety personnel that their actions are causing the creation of a new incident scene focus area. For example, a small red dot may appear in a police officer's head-mounted display when they continuously focus on (for example, look at, point at, face, move toward) an object or person for an extended period of time but an incident scene focus area has not yet been created. The small red dot may start blinking to indicate that a new incident scene focus area is being created (for example, when other nearby sources 105 start focusing on the same object or person). As a further example, a soft alert tone may be emitted by police officer's radio when they continuously focus on a person or object for an extended period of time but an incident scene focus area has not yet been created. The alert tone may change from the soft alert to a loud alert tone to indicate that a new incident scene focus area is being created (for example, when other nearby sources 105 start focusing on the same object or person).

Not every intersection between the weighted position vectors of multiple sources 105 is caused by a developing incident. For example, several safety personnel may be looking at a baby or a dog. The safety personnel may be unaware that their actions can cause the creation of an incident scene focus area. Informing sources 105, via feedback, that their actions are causing the creation of an incident scene focus area can deter such activities.

In some embodiments, the data analytics engine 110 uses filters to ensure that the intersection of weighted position vectors from multiple nearby sources 105 is caused by a developing incident. Incidents may involve safety personnel looking directly at the face of an individual. In some embodiments, the data analytics engine 110 checks if a height of the weighted position vectors off the ground is above a threshold. In such embodiments, the data analytics engine 110 adds a new incident scene focus area when the height of intersecting weighted position vectors from the multiple nearby sources 105 is greater than the threshold. In other embodiments, the data analytics engine 110 filters intersecting weighted position vectors based on face detection. Sources 105 can include cameras that capture image data (for example, a camera coupled to a head-mounted display or a body-mounted camera). In some embodiments, these cameras are configured to detect (for example, the presence and/or location of) faces in the image data. In such embodiments, the data analytics engine 110 queries sources 105 with intersecting weighted position vectors to determine when at least one of their cameras detects a face. In alternate embodiments, the data analytics engine 110 is configured to receive image data from the cameras of sources 105. In such embodiments, the data analytics engine 110 is configured to detect faces in the image data received from sources 105. The data analytics engine 110 adds a new incident scene focus area when there is a face detection associated with a camera of at least one of the sources 105 with intersecting weighted position vectors.

As noted above, the sources 105 are not limited to devices worn or carried by public safety personnel. In some embodiments, the plurality of sources 105 further includes electronic observation devices such as security cameras, traffic cameras, cameras mounted at street or highway intersections, and cameras on unmanned aerial vehicles.

Figure 5:
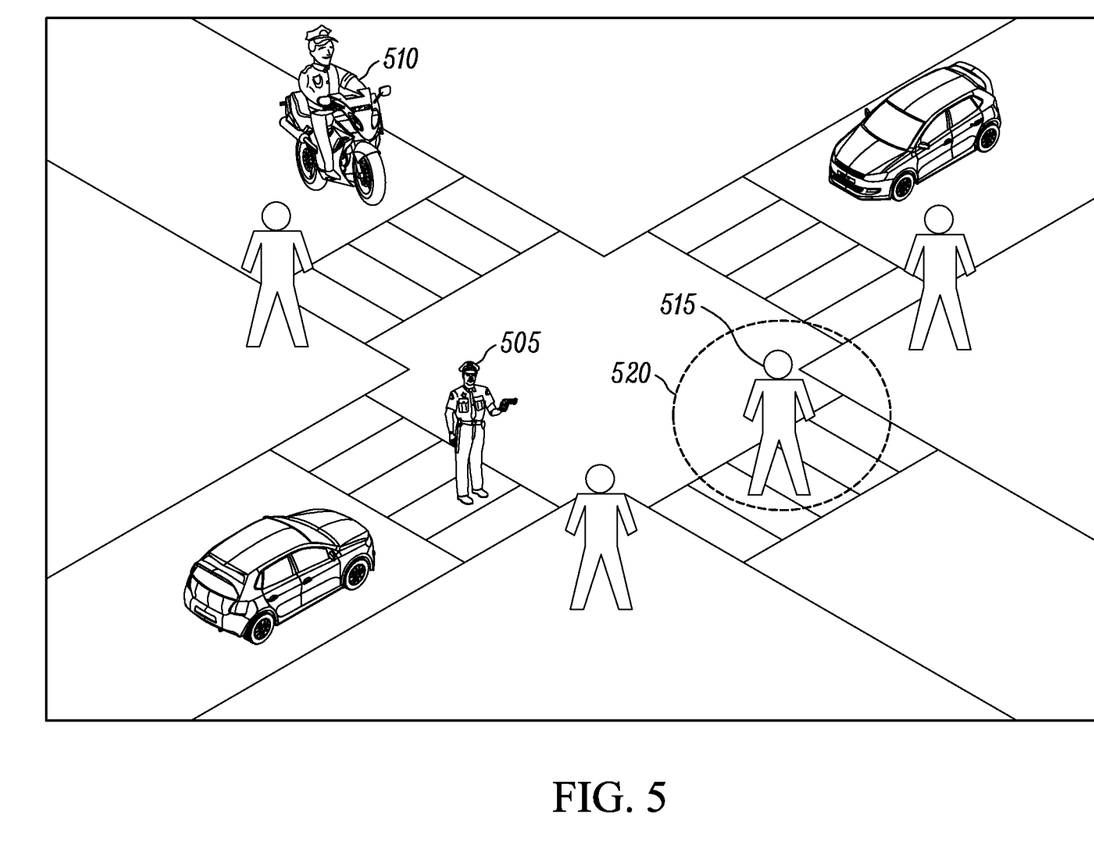
FIG. 5 is a diagram of an exemplary situation, in accordance with some embodiments.

FIG. 5 illustrates an exemplary situation involving a first police officer 505 and a second police officer 510. Each police officer 505 and 510 carries or wears one or more sources 105. The eyes, the head, and the weapon of the first police officer 505 are all pointing in the direction of a suspect 515. The eyes and the head of the second police officer 510 are also pointing in the direction of the suspect 515. In addition, the second police officer 510 is moving in the direction of the suspect 515. The data analytics engine 110 receives a plurality of directional inputs 115 from the sources 105 associated with the first police officer 505 and the second police officer 510. The data analytics engine 110 determines a location where the plurality of directional inputs 115 intersect and identifies an incident scene focus area 520 (indicated in FIG. 5 as a broken circle) around the suspect 515.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of incident scene focus area determination, the method comprising:
   receiving a plurality of directional inputs from a plurality of sources;
   assigning weighting factors to the plurality of directional inputs;
   generating weighted position vectors for each of the plurality of sources based on the plurality of directional inputs and the weighting factors;
   determining when the weighted position vectors for at least two sources of the plurality of sources intersect;
   determining an intersection location between the weighted position vectors of the at least two sources;
   determining a confidence level for the intersection location based on the weighted position vectors of the at least two sources; and
   identifying an incident scene focus area based on the intersection location and the confidence level.

2. The method of claim 1, wherein the plurality of directional inputs includes at least one selected from a group consisting of a weapon fired direction, an eye direction, a weapon drawn direction, a head direction, a hand direction, and a camera direction, and a movement direction.

3. The method of claim 1, wherein the plurality of directional inputs includes at least an eye direction and a movement direction, and wherein a first weighting factor assigned to the eye direction is greater than a second weighting factor assigned to the movement direction.

4. The method of claim 1, wherein a size of the incident scene focus area is proportional to the confidence level.

5. The method of claim 1, further comprising:
   determining when a height off the ground of the weighted position vectors of the at least two sources is greater than a threshold; and
   adding the incident scene focus area to a map when the height off the ground of the weighted position vectors of the at least two sources is greater than the threshold.

6. The method of claim 1, further comprising:
    detecting a face in image data captured by a camera of one of the at least two sources; and
    adding the incident scene focus area to a map when the face is detected in the image data.

7. The method of claim 1, further comprising:
    adding the incident scene focus area to a map when the confidence level is greater than a first threshold; and
    removing the incident scene focus area from the map when the confidence level is less than a second threshold,
    wherein the second threshold is less than the first threshold.

8. The method of claim 1, further comprising:
    detecting a change in at least one selected from a first group consisting of the intersection location and the confidence level; and
    updating, based on the change, at least one selected from a second group consisting of a location of the incident scene focus area and a size of the incident scene focus area.

9. The method of claim 1, further comprising:
    providing feedback to the at least two sources indicating that the weighted position vectors are being used to determine the incident scene focus area.

10. The method of claim 1, further comprising:
    detecting a split incident based on the weighted position vectors of the at least two sources; and
    adding a split incident scene focus area to a map when the split incident is detected.

11. A data analytics engine for incident scene focus area determination, the data analytics engine comprising:
    a transceiver configured to communicate with a plurality of sources through at least one communication network; and
    an electronic processor electrically coupled to the transceiver and configured to:
        receive a plurality of directional inputs from the plurality of sources,
        assign weighting factors to the plurality of directional inputs,
        generate weighted position vectors for each of the plurality of sources based on the plurality of directional inputs and the weighting factors,
        determine when the weighted position vectors for at least two sources of the plurality of sources intersect,
        determine an intersection location between the weighted position vectors of the at least two sources,
        determine a confidence level for the intersection location based on the weighted position vectors of the at least two sources, and
        identify an incident scene focus area based on the intersection location and the confidence level.

12. The data analytics engine of claim 11, wherein the plurality of directional inputs includes at least one selected from a group consisting of a weapon fired direction, an eye direction, a weapon drawn direction, a head direction, a hand direction, and a camera direction, and a movement direction.

13. The data analytics engine of claim 11, wherein the plurality of directional inputs includes at least an eye direction and a movement direction, and wherein a first weighting factor assigned to the eye direction is greater than a second weighting factor assigned to the movement direction.

14. The data analytics engine of claim 11, wherein a size of the incident scene focus area is proportional to the confidence level.

15. The data analytics engine of claim 11, wherein the electronic processor is further configured to:
    determine when a height off the ground of the weighted position vectors of the at least two sources is greater than a threshold, and
    add the incident scene focus area to a map when the height off the ground of the weighted position vectors of the at least two sources is greater than the threshold.

16. The data analytics engine of claim 11, wherein the electronic processor is further configured to:
    detect a face in image data captured by a camera of one of the at least two sources, and
    add the incident scene focus area to a map when the face is detected in the image data.

17. The data analytics engine of claim 11, wherein the electronic processor is further configured to:
    add the incident scene focus area to a map when the confidence level is greater than a first threshold, and
    remove the incident scene focus area to the map when the confidence level is less than a second threshold,
    wherein the second threshold is less than the first threshold.

18. The data analytics engine of claim 11, wherein the electronic processor is further configured to:
    detect a change in at least one selected from a first group consisting of the intersection location and the confidence level, and
    update, based on the change, at least one selected from a second group consisting on a location of the incident scene focus area and a size of the incident scene focus area.

19. The data analytics engine of claim 11, wherein the electronic processor is further configured to:
    provide feedback to the at least two sources indicating that the weighted position vectors are being used to determine the incident scene focus area.

20. The data analytics engine of claim 11, wherein the electronic processor is further configured to:
    detect a split incident based on the weighted position vectors of the at least two sources, and
    add a split incident scene focus area to a map when the split incident is detected.

* * * * *